(12) United States Patent
Ameling et al.

(10) Patent No.: US 12,177,107 B2
(45) Date of Patent: Dec. 24, 2024

(54) METHODS, SYSTEMS AND COMPUTER READABLE MEDIA FOR NON-INTRUSIVE QUEUE ANALYSIS

(71) Applicant: Keysight Technologies, Inc., Santa Rosa, CA (US)

(72) Inventors: Thomas Ameling, Woodland Hills, CA (US); Razvan Ionut Stan, Agoura Hills, CA (US); Winston Wencheng Liu, Woodland Hills, CA (US); Dan Mihailescu, Mogosoaia (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 15 days.

(21) Appl. No.: 18/107,363

(22) Filed: Feb. 8, 2023

(65) Prior Publication Data

US 2024/0267317 A1  Aug. 8, 2024

(30) Foreign Application Priority Data

Feb. 7, 2023 (RO) .............................. a 2023 00055

(51) Int. Cl.
*H04L 43/50* (2022.01)
*H04L 43/062* (2022.01)
*H04L 43/0882* (2022.01)

(52) U.S. Cl.
CPC ............ *H04L 43/50* (2013.01); *H04L 43/062* (2013.01); *H04L 43/0882* (2013.01)

(58) Field of Classification Search
CPC .... H04L 43/50; H04L 43/062; H04L 43/0882
See application file for complete search history.

(56) References Cited

U.S. PATENT DOCUMENTS

| | | | |
|---|---|---|---|
| 8,537,839 B2 | 9/2013 | Gintis et al. | |
| 9,219,667 B2 | 12/2015 | Badea et al. | |
| 9,590,909 B2 | 3/2017 | Mogul et al. | |
| 9,800,508 B2 | 10/2017 | Janardhanan | |
| 9,843,525 B2 | 12/2017 | Beecroft et al. | |
| 9,860,152 B2 | 1/2018 | Xia et al. | |
| 10,581,715 B1 | 3/2020 | Thompson et al. | |
| 10,608,939 B1 | 3/2020 | Kim et al. | |
| 10,644,985 B1 * | 5/2020 | Rathnamaiah | .......... H04L 69/16 |

(Continued)

OTHER PUBLICATIONS

Notice of Allowance and Examiner-Initiated Interview Summary for U.S. Appl. No. 17/860,932 (Dec. 8, 2023).

(Continued)

*Primary Examiner* — Rachel J Hackenberg (57) ABSTRACT

The subject matter described herein includes methods, systems, and computer readable media for non-intrusive queue analysis. A method for non-intrusive queue analysis occurs at a test analyzer of a test system, the test analyzer for analyzing packet queue performance of a system under test (SUT). The method comprising: receiving, via at least one mirrored ingress port of the SUT, a plurality of copied ingress test packets; receiving, via at least one mirrored egress port of the SUT, a plurality of copied egress test packets; correlating, using a correlation technique, the plurality of copied ingress test packets and the plurality of copied egress test packets; and generating, using the correlated packets, at least one packet queue performance metric associated with the SUT.

20 Claims, 5 Drawing Sheets

(56) References Cited

U.S. PATENT DOCUMENTS

| | | | |
|---|---|---|---|
| 11,258,719 | B1 | 2/2022 | Sommers |
| 11,621,908 | B2 | 4/2023 | Liu et al. |
| 11,962,434 | B2 | 4/2024 | Ameling et al. |
| 2001/0055274 | A1 | 12/2001 | Hegge et al. |
| 2011/0125517 | A1 | 5/2011 | Dhoble |
| 2014/0258781 | A1 | 9/2014 | Cook |
| 2015/0281027 | A1* | 10/2015 | Hutchison ............... H04L 43/50 |
| | | | 370/250 |
| 2019/0036802 | A1 | 1/2019 | Kuttuva Jeyaram |
| 2019/0354406 | A1 | 11/2019 | Ganguli et al. |
| 2019/0372873 | A1 | 12/2019 | Beeram et al. |
| 2019/0386924 | A1 | 12/2019 | Srinivasan et al. |
| 2020/0067792 | A1 | 2/2020 | Aktas et al. |
| 2020/0112487 | A1 | 4/2020 | Inamdar et al. |
| 2020/0120029 | A1 | 4/2020 | Sankaran et al. |
| 2020/0287967 | A1* | 9/2020 | Gafni .................. H04L 12/4633 |
| 2020/0313999 | A1 | 10/2020 | Lee et al. |
| 2020/0326971 | A1 | 10/2020 | Yang |
| 2020/0366608 | A1 | 11/2020 | Pan et al. |
| 2021/0112002 | A1* | 4/2021 | Pan ......................... H04L 45/74 |
| 2021/0409506 | A1* | 12/2021 | Radi .................. H04L 47/6215 |
| 2022/0006712 | A1* | 1/2022 | Murray ............... H04L 43/0876 |
| 2022/0014457 | A1 | 1/2022 | Liu et al. |
| 2022/0014473 | A1* | 1/2022 | Matthews ........... H04L 43/0882 |
| 2022/0052970 | A1 | 2/2022 | Radi et al. |
| 2022/0060422 | A1 | 2/2022 | Sommers |
| 2023/0038749 | A1* | 2/2023 | Bahadur ............... H04L 49/113 |
| 2023/0146525 | A1 | 5/2023 | Ball |
| 2023/0188447 | A1* | 6/2023 | Alleyne .................. H04L 47/12 |
| | | | 709/224 |
| 2023/0198676 | A1 | 6/2023 | K N et al. |
| 2024/0015051 | A1 | 1/2024 | Ameling et al. |
| 2024/0098023 | A1* | 3/2024 | Guo .................... H04L 47/2483 |

OTHER PUBLICATIONS

Andersen, et al., "Parallel Data Lab", Carnegie Melon, https://www.pdl.cmu.edu/Incast/, n.d., (retrieved Aug. 2023).

Alizadeh et al., "Data Center TCP (DCTCP)," SIGCOMM '10, pp. 1-12 (Aug. 30-Sep. 3, 2010).

Grochla, "Simulation comparison of active queue management algorithms in TCP/IP networks," Telecommunication Systems, pp. 1-9 (Oct. 2008).

Barak, "Introduction to Remote Direct Memory Access (RDMA)," http://www.rdmamojo.com/2014/03/31/remote-direct-memory-access-rdma/, pp. 1-14 (Mar. 31, 2014).

"Quick Concepts Part 1—Introduction to RDMA," ZCopy, Education and Sample Code for RDMA Programming, pp. 1-5 (Oct. 8, 2010).

Zhu et al., "Congestion Control for Large-Scale RDMA Deployments," SIGCOMM '15, pp. 1-14 (Aug. 17-21, 2015).

Zhu et al., "Packet-Level Telemetry in Large Datacenter Networks," SIGCOMM '15, pp. 1-13 (Aug. 17-21, 2015).

Mittal et al., "Timely: RTT-based Congestion Control for the Datacenter," SIGCOMM '15, pp. 1-14 (Aug. 17-21, 2015).

"RoCE in the Data Center," Mellanox Technologies, White Paper, pp. 1-3 (Oct. 2014).

Kim et al., "In-band Network Telemetry (INT)," pp. 1-28 (Jun. 2016).

Zhu et al., "ECN or Delay: Lessons Learnt from Analysis of DCQCN and Timely," CoNEXT '16, pp. 1-15 (Dec. 12-15, 2016).

Varadhan et al., "Validating ROCEV2 in the Cloud Datacenter," OpenFabrics Alliance, 13th Annual Workshop 2017, pp. 1-17 (Mar. 31, 2017).

Mittal et al., "Revisiting Network Support for RDMA," SIGCOMM '18, pp. 1-14 (Aug. 20-25, 2018).

"Understanding RoCEv2 Congestion Management," Mellanox, https://community.mellanox.com/s/article/understanding-rocev2-congestion-management, pp. 1-6 (Dec. 3, 2018).

"Data Center Quantized Congestion Notification (DCQCN)," Juniper Networks, pp. 1-7 (Oct. 4, 2018).

"Understanding DC-QCN Algorithm for RoCE Congestion Control," Mellanox, pp. 1-4 (Dec. 5, 2018).

Geng et al., "P4QCN: Congestion Control Using P4-Capable Device in Data Center Networks," Electronics, vol. 8, No. 280, pp. 1-17 (Mar. 2, 2019).

Mandal, "In-band Network Telemetry—More Insight into the Network," Ixia, https://www.ixiacom.com/company/blog/band-network-telemetry-more-insight-network, pp. 1-9 (Mar. 1, 2019).

"What is RDMA?," Mellanox, pp. 1-3 (Apr. 7, 2019).

"RoCE Congestion Control Interoperability Perception vs. Reality," Broadcom White Paper, pp. 1-8 (Jul. 23, 2019).

Even et al, "Data Center Fast Congestion Management," pp. 1-15 (Oct. 23, 2019).

Li et al., "HPCC: High Precision Congestion Control," SIGCOMM '19, pp. 1-15 (Aug. 19-23, 2019).

Chen et al., "Data Center Congestion Management requirements," https://tools.ietf.org/id/draft-yueven-tsvwg-dcom-requirements-01.html, pp. 1-7 (Jul. 2019).

"H3C S6850 Series Data Center Switches," New H3C Technologies Co., Limited, pp. 1-13 (Mar. 2020).

"Traffic Management User Guide (QFX Series and EX4600 Switches)," Juniper Networks, pp. 1-1121 (Mar. 18, 2020).

Byagowi et al., "Bringing the F16 Network into the Lab," Open Platinum, pp. 1-16 (2020).

Liu et al., "HPCC++: Enhanced High Precision Congestion Control," Network Working Group, pp. 1-15 (Jun. 17, 2020).

Beltman et al., "Collecting telemetry data using P4 and RDMA," University of Amsterdam, pp. 1-12 (2020).

Non-Final Office Action for U.S. Appl. No. 17/001,614 (Apr. 23, 2021).

Notice of Allowance and Fee(s) Due for U.S. Appl. No. 17/001,614 (Sep. 29, 2021).

Notice of Allowance and Fee(s) Due for U.S. Appl. No. 17/319,872 (Nov. 25, 2022).

Non-Final Office Action for U.S. Appl. No. 17/319,872 (Aug. 2, 2022).

Non-Final Office Action for U.S. Appl. No. 17/860,932 (Aug. 3, 2023).

Commonly-Assigned, co-pending U.S. Appl. No. 17/860,932 for "Methods, Systems, and Computer Readable Media for Capturing Dropped Packets at a Switching Fabric Emulator" (Unpublished, filed Jul. 8, 2022).

\* cited by examiner

METHODS, SYSTEMS AND COMPUTER READABLE MEDIA FOR NON-INTRUSIVE QUEUE ANALYSIS

TECHNICAL FIELD

The subject matter described herein relates to network equipment testing. More particularly, the subject matter described herein relates to methods, systems, and computer readable media for non-intrusive queue analysis.

BACKGROUND

Network operators typically test network nodes for reliability and other characteristics before deploying the network nodes to production environments (e.g., non-test environments). Generally, it is important to test networks nodes with various amounts of traffic and different types of traffic. For example, a test platform, such as an IxNetwork™ platform manufactured by Keysight, may be usable for network topology testing and traffic analysis and may generate test traffic for testing various network nodes using one or more protocols.

While a test platform may attempt to perform testing of network equipment, like network switches or other devices, issues can arise when the equipment being tested does not support in-line telemetry (INT) and/or does not utilize appropriate or efficient interfaces for obtaining relevant performance or feedback information (e.g., internal state information, queue performance data, usage statistics or other useful information). While some test platforms may compensate for those types of network equipment by using intrusive (e.g., resource intensive or performance altering) methods to obtain feedback from a system under test, such methods may negatively affect testing by skewing performance metrics or providing inaccurate feedback.

Accordingly, there is a need for non-intrusive queue analysis.

SUMMARY

The subject matter described herein includes methods, systems, and computer readable media for non-intrusive queue analysis. A method for non-intrusive queue analysis occurs at a test analyzer of a test system, the test analyzer for analyzing packet queue performance of a system under test (SUT). The method comprising: receiving, via at least one mirrored ingress port of the SUT, a plurality of copied ingress test packets; receiving, via at least one mirrored egress port of the SUT, a plurality of copied egress test packets; correlating, using a correlation technique, the plurality of copied ingress test packets and the plurality of copied egress test packets; and generating, using the correlated packets, at least one packet queue performance metric associated with the SUT.

A system for non-intrusive queue analysis includes a test system comprising a test analyzer implemented using at least one processor and a memory. The test analyzer is configured for: receiving, via at least one mirrored ingress port of the SUT, a plurality of copied ingress test packets; receiving, via at least one mirrored egress port of the SUT, a plurality of copied egress test packets; correlating, using a correlation technique, the plurality of copied ingress test packets and the plurality of copied egress test packets; and generating, using the correlated packets, at least one packet queue performance metric associated with the SUT.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
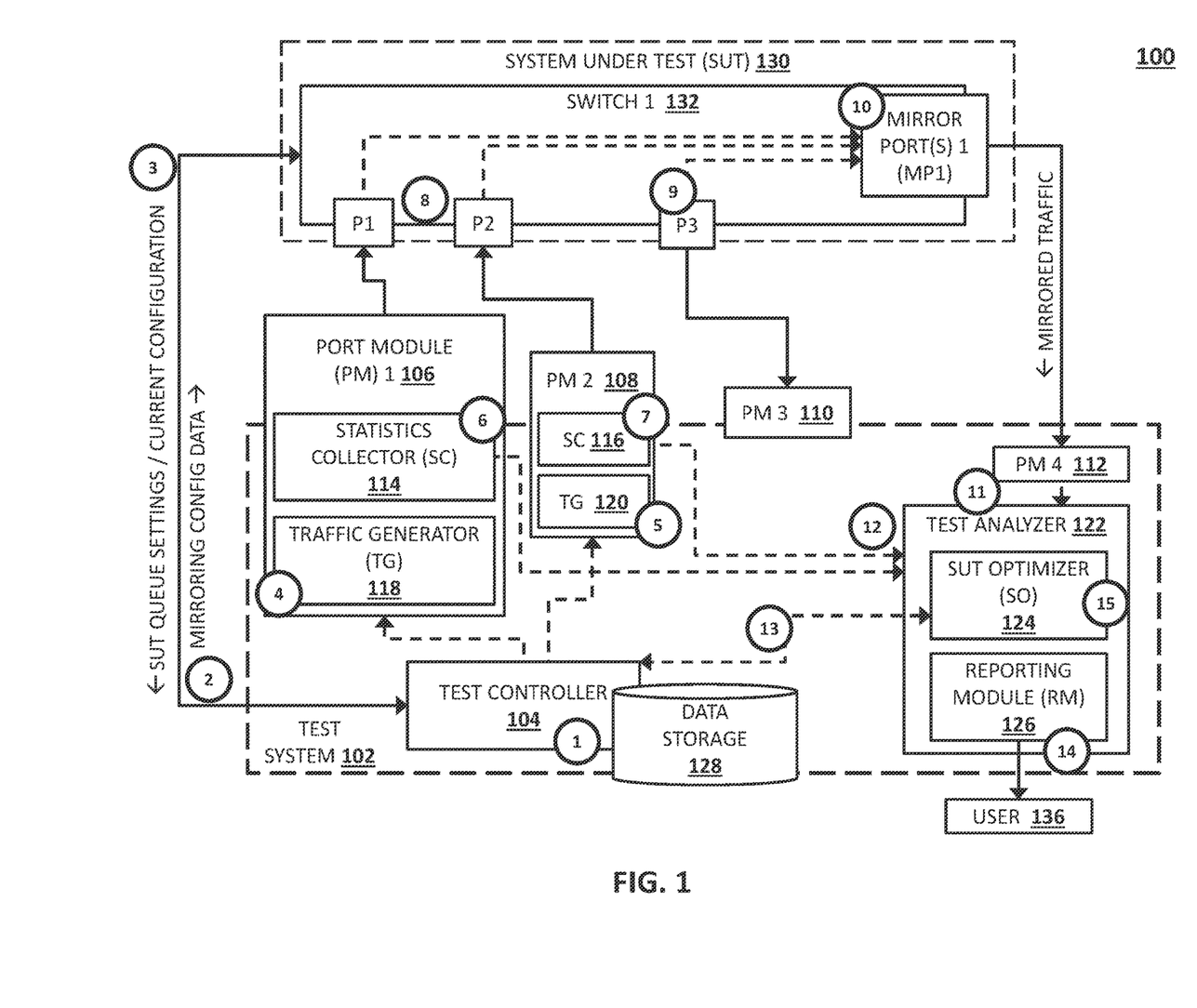
FIG. 1 is a block diagram illustrating an example environment including a test system for performing non-intrusive queue analysis involving a system under test (SUT)

FIG. 1 is a diagram illustrating an example environment 100 including a test system 102 for performing various test related operations. Test system 102 may represent any suitable entity or entities (e.g., one or more testing platforms, nodes, or devices) associated with sending or receiving traffic (e.g., one or more data units) and/or for testing one or more network nodes and/or networks, also referred to herein as a system under test (SUT) 130. For example, test system 102 or related entities may generate and send test traffic to SUT 130, e.g., one or more network switches, smart NICs, remote direct memory access (RDMA) NICs (e.g., RDMA over Converged Ethernet (RoCE) NICs), or one or more network nodes comprising message or packet queues (e.g., ingress and/or egress queues). In this example, test system 102 may send test traffic to SUT 130, receive the test traffic or related traffic from SUT 130, and analyze one or more performance aspects (e.g., packet queue performance, like latency, jitter, packet distributions, etc.) associated with SUT 130.

In some embodiments, test system 102 may be a stand-alone tool, a testing device, a testing platform, or software executing on at least one processor. In some embodiments, test system 102 may be a single node or may be distributed across multiple computing platforms or nodes.

In some embodiments, test system 102 may include one or more modules for performing various functions or operations. For example, test system 102 may include a server and client emulation module for emulating a node or device that communicates with SUT 130.

In some embodiments, test system 102 may provide a user interface for communicating with a test operator (e.g., user 136) and/or another entity. In some embodiments, a user interface associated with test system 102 may support automation (e.g., via one or more scripting languages), a representation state transfer (REST) API, a command line, and/or a web-based GUI. For example, user 136 may be any entity (e.g., an automated system or a device or system controlled or controllable by a human user) for selecting and/or configuring various aspects associated with configuring and/or executing one or more tests or test sessions. In this example, user 136 may utilize a management application user interface (API) and/or a graphical user interface (GUI)) may be provided for providing test configuration information, such as a test session definition, test traffic template information, performance metrics to be computed, environment settings, network topology, etc.

Test system 102 may include a test controller 104, port modules (PMs) 106-112, a test analyzer 122, and a data storage 128. Test controller 104 may be any suitable entity or entities (e.g., software executing on a processor, an application-specific integrated circuit (ASIC), a field programmable gate array (FPGA), or a combination of software, an ASIC, or an FPGA) for performing one or more aspects associated with test session configuration and related management. For example, test controller 104 may receive test session information, e.g., configuration instructions associated with a test case and may provision or provide the configuration instructions to various test system components, e.g., PMs 106-112. In this example, the configuration instructions may be communicated to various test system components via an external or internal communications channel or protocol.

In some embodiments, test system 102 or test controller 104 may send configuration instruction to SUT 130 or related entities. For example, when testing packet queue performance of SUT 130, test controller 104 may send instructions for configuring port mirroring at one or more ports under test at SUT 130 (e.g., switch 132). For example, the mirroring configuration data may indicate what type of traffic is to mirrored, what ports are supposed to copy the traffic, where the copied traffic is supposed to be forwarded or sent (e.g., a mirror port) for transmission to test system 102, and/or metadata to include with the copied packets (e.g., a transmit timestamp and/or a receipt timestamp for each packet).

PMs 106-112 may include or utilize any suitable entity or entities (e.g., one or more network interface cards (NICs), physical processors, and/or other hardware) for sending or receiving communications. For example, test system 102 or test controller 104 may use one or more multiple PMs 106-112 (e.g., communications interfaces or network interface cards (NICs)) for receiving and/or sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, PMs 106-112 may include various hardware and/or software that is configurable for processing, generating, sending, and/or receiving test traffic. For example, PMs 106-112 or components therein may be configured or provisioned by test controller 104 or configuration instructions received therefrom. In this example, the configuration instructions may include instructions for configuring or controlling statistics collectors (SCs) 114 and 116 and traffic generator (TGs) 118 and 120 or other entities.

SCs 114 and 116 may be any suitable entity or entities (e.g., software executing on a processor, an ASIC, an FPGA, or a combination of software, an ASIC, or an FPGA) for generating, obtaining, or deriving metrics, statistics, or metadata associated with test traffic or related traffic (e.g., responses from SUT 130) or entities thereof (e.g., switch 132). For example, SC 114 may generate timestamp information indicating when each test packet is sent from PM 106 and SC 116 may generate timestamp information indicating when each test packet is sent from PM 108. In this example, each of SCs 114 and 116 may store various information in a data store (e.g., data storage 128) and/or provide the information to test analyzer 122 and/or other entities.

In some embodiments, each of PMs 110 and 112 may also include SCs. In such embodiments, the respective SC at PMs 110 and 122 may generate or derive metrics, statistics, or metadata associated with received traffic (e.g., responses from SUT 130) or entities thereof (e.g., switch 132).

Each of TGs 118 and 120 may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. For example, TG 118 may receive configuration instructions (e.g., test traffic templates and/or related data) from test controller 104 or another source. In this example, TG 118 may use the instructions to generate test traffic associated with a test session or related scenario.

In some embodiments, each of PMs 106-112 may include one or more transmit ports for sending test packets to SUT 130 or a node thereof and/or one or more receive ports for receiving test packets back from SUT 130 or a node thereof. For example, PMs 106 and 108 or port(s) thereof may be configured to send test traffic to various ports of SUT 130 and PMs 110 and 112 or port(s) thereof may be configured to receive the test traffic or responses to the test traffic from SUT 130.

In some embodiments, each of PMs 106-112 may be associated with a particular application or service, a test flow, one or more portions or aspects of SUT 130, types of traffic, and/or an IP address and port. For example, PM In some embodiments, each of PMs 106-112 or entities therein may include or access data storage 128 and/or local memory. In some embodiments, after sending or receiving test packets or related messages from SUT 130, one or more of PMs 106-112 or entities therein (e.g., SCs 114 and 116) may be configured to generate various performance metrics or related statistics. In some embodiments, performance metrics may include latency, packet drops, and/or various packet queue performance metrics (e.g., an average queue size or depth, a maximum queue size, a minimum queue size, a jitter average, a jitter minimum, a jitter maximum, queue distributions, and/or latency distributions).

Test analyzer 122 may be any suitable entity or entities (e.g., software executing on a processor, an ASIC, an FPGA, or a combination of software, an ASIC, or an FPGA) for analyzing test results or related data to determine performance analytics or metrics. For example, test analyzer 122 may obtain various SUT performance related data from PMs 106-112 and/or other entities associated with test system 102. Continuing with this example, test analyzer 122 or a related entity may generate performance reports or test analysis reports associated with SUT 130 and may send the reports to user 136 or other entities for analysis or other purposes. In some embodiments, test analyzer 122 may include system with one or more processors (e.g., central processor units (CPUs)) for capturing and analyzing traffic or related performance information, e.g., offline (e.g., after testing session) or online (e.g., during testing session).

In some embodiments, test analyzer 122 may include a SUT optimizer (SO) 124 and/or a reporting module (RM) 126. SO 124 may be any suitable entity or entities (e.g., software executing on a processor, an ASIC, an FPGA, or a combination of software, an ASIC, or an FPGA) for performing one or more aspects associated with generating SUT optimizations, e.g., optimization plans or packet queue related settings for improving one or more aspects of SUT performance. For example, SO 124 may generate or obtain performance metrics or related information and may use this information to adjust various settings that can affect SUT performance in real-world usage and/or subsequent testing. may be used to adjust testbed 113 for subsequent test sessions.

In some embodiments, SO 124 may generate or modify a test session definition based on current or historical test feedback information. For example, after testing SUT 130 using a predefined test session definition, SO 124 may determine, using test feedback information and user preferences, that increasing maximum queue depth for various packet queues by 50% may improve SUT performance (e.g., by reducing average queue latency and reducing packet drops). In this example, in addition to generating and providing updated SUT queue settings (or related configuration instructions), SO 124 may also adjust a test session definition to increase test packet transmission rate by 30% and may notify test controller 104 such that subsequent test sessions may be executed using the updated test session definition.

Reporting module (RM) 126 may be any suitable entity or entities (e.g., software executing on a processor, an ASIC, an FPGA, or a combination of software, an ASIC, or an FPGA) for performing one or more aspects associated with reporting results or other information regarding test sessions, test cases, or related test packets. For example, RM 126 may receive reports, optimization plans, or other data from SO 124 or another entity and may provide the information to user 136, e.g., in various formats and manners, like a GUI, an API, or an email with formatted report document.

In some embodiments, test system 102, test analyzer 122 and/or another entity may perform non-intrusive packet queue analysis. For example, test analyzer 122 may receive timestamped copies packets entering or leaving SUT 130 (e.g., captured or obtained via test-system configured port mirroring at SUT 130) and may correlate these packets to compile or generate a report indicating performance information and/or detailed composition (e.g., queue latency and/or jitter minimum, maximum, average, and distribution statistics) of SUT related packet queues over time (e.g., during a test session or portion thereof). In another example, test analyzer 122 may analyze copied packets and related metadata to derive a current SUT configuration (e.g., a quality of service (QOS) configuration) or an entity thereof and may also generate an optimization plan indicating a new SUT configuration for attempting to reach a user-inputted goal (e.g., threshold values for buffer, packet loss, and/or latency like lowest latency with zero packet loss).

In some embodiments, test system 102, test analyzer 122 and/or another entity may utilize test feedback information to improve performance of SUT 130 or an entity thereof. For example, after analyzing and/or correlating copied timestamped test packets, test system 102, test analyzer 122 and/or another entity may generate configuration information or related instructions for adjusting a data center quantized congestion notification (DCQCN) setting, a priority based flow control (PFC) setting, an explicit congestion notification (ECN) setting, a maximum queue depth value, and/or a remote direct memory access (RDMA) network interface card setting at SUT 130 or entity thereof (e.g., switch 132).

In some embodiments, test system 102, test analyzer 122 and/or another entity may run an iterative series of test sessions, where test each session may involving adjusting queue related settings or other settings at SUT 130 until a stop condition is met (e.g., a user-inputted goal is reached, improvement has plateaued, or user 136 issues a stop command to test system 102). In such embodiments, test system 102, test analyzer 122, or another entity (e.g., SO 124) may analyze feedback collected from each test session when attempting to optimize or improve SUT performance, e.g., by adjusting one or more packet queue settings.

In some embodiments, by using port mirroring and/or other techniques to perform non-intrusive queue analysis, test system 102, test analyzer 122 and/or another entity may explore queue performance or impacts therefrom in various use cases, e.g., a control plane data plane convergence test (e.g., for testing the convergence time from the start of the control plane event triggering data plane switchover to the traffic flows converging on a secondary port) or when evaluating a single switch unfairness/fluctuations issues. For example, test system 102, test analyzer 122 and/or another entity can use non-intrusive queue analysis to determine how often queue (e.g., buffer) overrun events (e.g., events that caused packet drops) occurred during a particular test session or related scenario, how much larger the queue would to be to avoid a queue overrun event during a particular test session or related scenario, and/or how close were overrun events to occurring during a particular test session or related scenario (e.g., test system 102, test analyzer 122 and/or another entity may determine how many packets would have been dropped if the buffer were 10% smaller).

Data storage 128 may be any suitable entity or entities (e.g., a storage device, a non-transitory computer readable medium, or a storage system) for maintaining or storing information related to testing and/or related metrics. For example, data storage 128 may contain traffic models, test cases, test session data, topology information for SUT 130, analytics, derived SUT optimization settings or plans, updated or optimized queue related settings or configuration information, and/or other information usable for generating performance metrics (e.g., statistics) associated with SUT queue performance or one or more other aspects of SUT 130 or entities thereof (e.g., switch 132). In some embodiments, data storage 128 may be located at or accessible by test system 102, test analyzer 122, another node, or distributed across multiple platforms or devices.

SUT 130 may be any suitable entity or entities (e.g., devices, systems, or platforms) for communicating with test system 102 and/or receiving, processing, forwarding, and/or sending test traffic or other data. in some embodiments, SUT 130 includes a switch 132 and/or other devices (e.g., network nodes, routers, packet forwarding devices, etc.) that can include and utilize one or more message or packet queues, e.g., for temporarily holding reception and/or transmission. For example, SUT 130 may include a network router, a network switch, a network device, an RDMA NIC, a smart NIC. In another example, SUT 130 may include one or more systems, devices, and/or computing platforms, e.g., a group of switches, smartNICs, servers, and/or routers. In yet another example, SUT 130 may include one or more networks or related components, e.g., an access network, a core network, or the Internet.

As depicted in FIG. 1, test system 102 may send test traffic to switch 132 and then switch 132 may send the test traffic back to test system 102. By using mirrored packets and related timestamps to derive or compute various performance metrics including packet queue performance metrics, test system 102 or test analyzer 122 may perform non-intrusive queue analysis of the queues of switches 132 and 134.

Referring to FIG. 1, actions or steps 1-15 associated with an example test session scenario involving test environment 100 may be depicted. It will be appreciated that steps 1-15 are illustrative and may be different or occur in a different manner (e.g., some actions or steps may be concurrent) in different test environments or scenarios.

In step 1, a test session definition (e.g., a set of test configuration instructions for testing a particular test case or scenario) may by provisioned (e.g., user 136 or management node may provide configuration information to test controller 104 or another entity via a CLI or API) or selected (e.g., user 136 may select a definition from a set of predetermined or preloaded definitions via a GUI provided by test controller 104 or another entity).

In step 2, test controller 104 or another entity may use the test session definition when generating and sending mirror port configuration instructions to SUT 130 or switch 132 thereof. For example, using the test session definition or related information, test controller 104 may generate mirroring configuration information that instructs switch 132 to mirror traffic (e.g., test packets) on the ports (e.g., ports 'P1', 'P2', and 'P3') that interacts with test system 102 to one or more mirror ports (e.g., an egress PM for transmitting mirrored traffic and/or related metadata to test system 102).

In step 3, SUT information (e.g., packet queue settings or other information) may be obtained, e.g., by polling switch 132 or via automatic updates or a subscription model.

In step 4, TG 118 may be configured (e.g., by test controller 104) to generate test traffic and transmit the test traffic toward switch 132. For example, TG 118 on PM 106 may be configured to generate test packets and transmit the test packets to port 'P1' of switch 132.

In step 5, TG 120 may be configured (e.g., by test controller 104) to generate test traffic and transmit the test traffic toward switch 132. For example, TG 120 on PM 108 may be configured to generate test packets and transmit the test packets to port 'P2' of switch 132.

In step 6, SC 114 may be configured (e.g., by test controller 104) to collect and report metrics and/or statistics for test packets transmitted via PM 106. For example, SC 114 may generate metadata, e.g., a transmit timestamp information, for each test packet transmitted to switch 132 and may send the metadata (and optionally packet content) to test analyzer 122 or a data store accessible to test analyzer 122.

In step 7, SC 116 may be configured (e.g., by test controller 104) to collect and report metrics and/or statistics for test packets transmitted via PM 108. For example, SC 116 may generate metadata, e.g., a transmit timestamp information, for each test packet transmitted to switch 132 and may send the metadata (and optionally packet content) to test analyzer 122 or a data store accessible to test analyzer 122.

In step 8, test traffic from PMs 106 and 108 may be received at respective ingress ports (e.g., ports 'P1' and 'P2') of switch 132. For example, as packets are received at ports 'P1' and 'P2' of switch 132, the packets may be queued at ingress packet queues of switch 132 until they can be processed or transmitted onward.

In step 9, test traffic received at ingress ports (e.g., ports 'P1' and 'P2') of switch 132 may be switched or routed to an egress port (e.g., port 'P3') of switch 132 for transmitting the test traffic back to test system 102. For example, test packets received from test server 102 via ports 'P1' and 'P2' of switch 132 may be routed back to test system 102 (or PM 110) via port 'P3' of switch 132.

In step 10, concurrently with receiving or processing test traffic, ports (e.g., ports 'P1', 'P2', and 'P3') of switch 132 may generate metadata (e.g., packet timestamps) and may copy all of some test traffic and send the copies and to one or more mirror ports (e.g., port 'MP1') of switch 132. For example, port 'P1' may encapsulate a copy of a received test packet in another packet along with a receipt timestamp indicating when the test packet arrived from test system 102 and/or a transmission timestamp indicating when the test packet was forwarded from port 'P1' to port 'P3' and may send the encapsulated packet to port 'MP1' for transmission to test system 102. In another example, port 'P1' may generate a version of a received packet that incorporates or includes metadata (e.g., a transmit timestamp and/or a receipt timestamp) and send this packet to port 'MP1' for transmission to test system 102.

In step 11, mirrored traffic (e.g., timestamped copies of test traffic) may be sent from port 'MP1' of switch 132 to PM 112 of test system 102. In some embodiments, after receiving mirrored traffic, PM 112 may provide some or all the mirrored traffic, including, for example, associated metadata (e.g., timestamp information, etc.), to test analyzer 122.

In step 12, metrics and/or statistics (e.g., associated with transmitted test traffic collected by SCs 114 and 116) may be provided to and used by test analyzer 122. For example, test analyzer 122 may use a transmit timestamp indicating when a test packet was transmitted from PM 106 to port 'P1' of switch 132 to derive whether the test packet was received by port 'P1' of switch 132 or to determine a latency (or a start time for an ingress queue of switch 132) associated with port 'P1' of switch 132.

In step 13, SUT queue settings or related configuration information may be obtained and used by test analyzer 122. For example, test system 102 or another entity may obtain packet queue configuration information (e.g., packet queue configuration information (e.g., a DCQCN setting, a PFC setting, an ECN setting, a queue depth, or an RDMA NIC setting) from switch 132 via a management API or interface. In another example, user 136 may input switch configuration information indicating the current configuration (including, for example, packet queue settings) of switch 132, e.g., manually as part of test configuration setup.

In step 14, queue performance analysis information or other test results may be generated and provided to user 136 or another entity.

In step 15, in some embodiments or test sessions, queue performance analysis information or other test results may be used (e.g., by SO 124) to generate SUT optimizations, e.g., packet queue settings adjustments, and may be reported to user 136 or another entity. For example, test system 102 or a related entity (e.g., test controller 104) may communicate with switch 132 via a management interface and automatically configure or re-configure switch 132 to implement recommended packet queue adjustments generated by SO 124.

In some embodiments, SO 124 may use queue performance analysis information or other test results to generate and execute a new test session for testing SUT 130 or switch 132 thereof. For example, test system 102 or a related entity (e.g., test controller 104) may use a new or updated test session definition generated by SO 124 in running a subsequent test session for testing SUT 130 or switch 132 thereof.

It will be appreciated that FIG. 1 is for illustrative purposes and that different and/or additional steps other than those depicted in FIG. 1 may occur. Further, it will be appreciated that some steps may occur in a different order than depicted in FIG. 1 and that functionality described above in relation to FIG. 1 may be changed, altered, added, or removed. It will also be appreciated while the embodiment depicted in FIG. 1 involves switch 132, various embodiments may utilize different numbers of switches and switch ports and/or may involve interactions with other elements of SUT 130.

Figure 2:
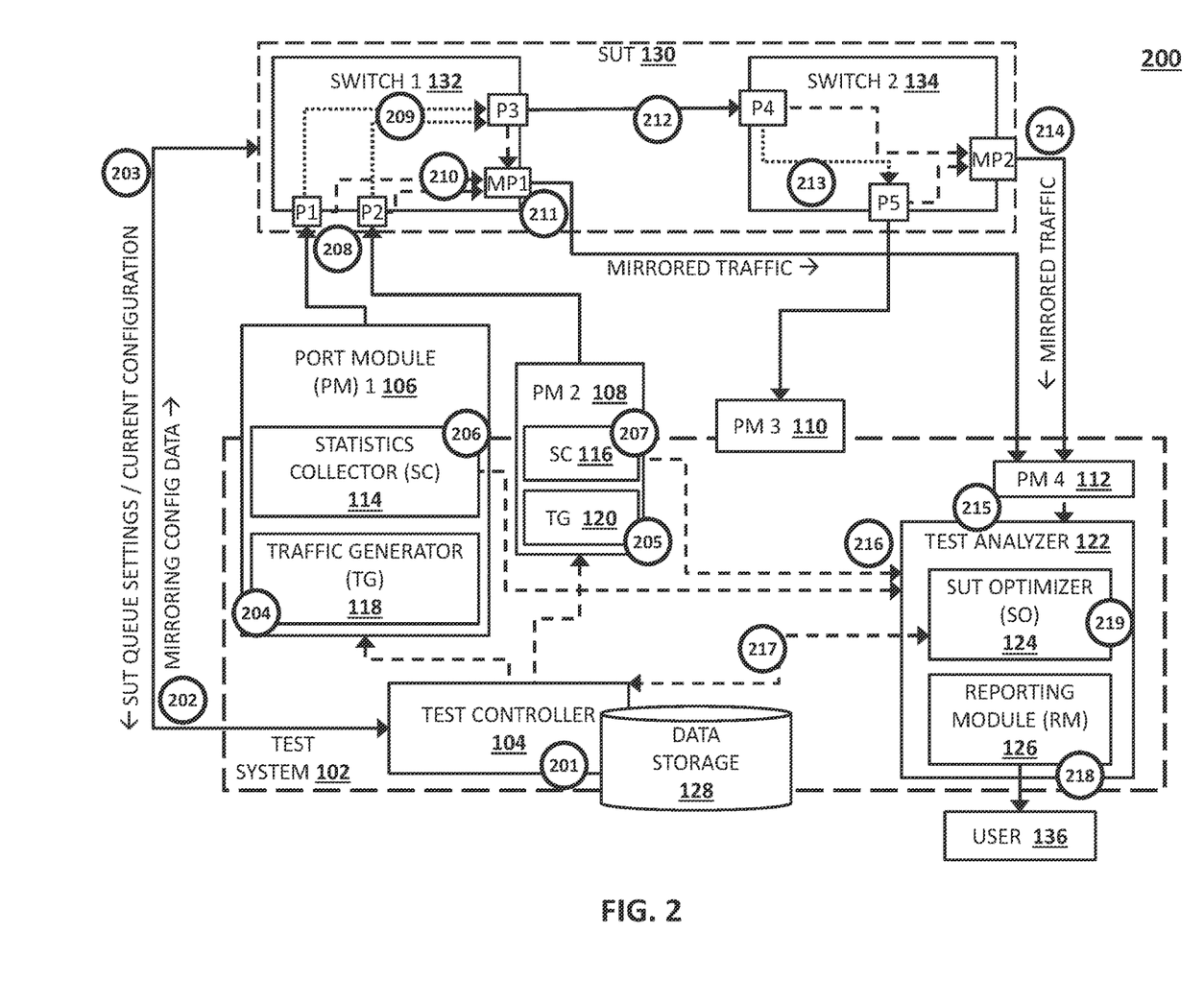
FIG. 2 is a block diagram illustrating an example environment including a test system for performing non-intrusive queue analysis involving a SUT comprising two switches.

FIG. 2 is a block diagram illustrating an example environment 200 including test system 102 for performing non-intrusive queue analysis involving SUT 130 comprising switches 132 and 134. As depicted in FIG. 2, test system 102 may send test traffic to switch 132, switch 132 may send the test traffic onward to switch 134, and then switch 134 may send the test traffic back to test system 102. By using mirrored packets and related timestamps to derive or compute various performance metrics including packet queue performance metrics, test system 102 or test analyzer 122 may perform non-intrusive queue analysis of the queues of switches 132 and 134.

Referring to FIG. 2, actions or steps 201-219 associated with an example test session scenario involving test environment 100 may be depicted. It will be appreciated that steps 201-219 are illustrative and may be different or occur in a different manner (e.g., some actions or steps may be concurrent) in different test environments or scenarios.

In step 201, a test session definition (e.g., a set of test configuration instructions for testing a particular test case or scenario) may by provisioned (e.g., user 136 or management node may provide configuration information to test controller 104 or another entity via a CLI or API) or selected (e.g., user 136 may select a definition from a set of predetermined or preloaded definitions via a GUI provided by test controller 104 or another entity).

In step 202, test controller 104 or another entity may use the test session definition when generating and sending mirror port configuration instructions to SUT 130 or switch 132 thereof. For example, using the test session definition or related information, test controller 104 may generate mirroring configuration information that instructs switch 132 to mirror traffic (e.g., test packets) on the ports (e.g., ports 'P1', 'P2', and 'P3') that interacts with test system 102 to one or more mirror ports (e.g., an egress PM for transmitting mirrored traffic and/or related metadata to test system 102).

In step 203, SUT information (e.g., packet queue settings or other information) may be obtained, e.g., by polling switch 132 or via automatic updates or a subscription model.

In step 204, TG 118 may be configured (e.g., by test controller 104) to generate test traffic and transmit the test traffic toward switch 132. For example, TG 118 on PM 106 may be configured to generate test packets and transmit the test packets to port 'P1' of switch 132.

In step 205, TG 120 may be configured (e.g., by test controller 104) to generate test traffic and transmit the test traffic toward switch 132. For example, TG 120 on PM 108 may be configured to generate test packets and transmit the test packets to port 'P2' of switch 132.

In step 206, SC 114 may be configured (e.g., by test controller 104) to collect and report metrics and/or statistics for test packets transmitted via PM 106. For example, SC 114 may generate metadata, e.g., a transmit timestamp information, for each test packet transmitted to switch 132 and may send the metadata (and optionally packet content) to test analyzer 122 or a data store accessible to test analyzer 122.

In step 207, SC 116 may be configured (e.g., by test controller 104) to collect and report metrics and/or statistics for test packets transmitted via PM 108. For example, SC 116 may generate metadata, e.g., a transmit timestamp information, for each test packet transmitted to switch 132 and may send the metadata (and optionally packet content) to test analyzer 122 or a data store accessible to test analyzer 122.

In step 208, test traffic from PMs 106 and 108 may be received at respective ingress ports (e.g., ports 'P1' and 'P2') of switch 132. For example, as packets are received at ports 'P1' and 'P2' of switch 132, the packets may be queued at ingress packet queues of switch 132 until they can be processed or transmitted onward.

In step 209, test traffic received at ingress ports (e.g., ports 'P1' and 'P2') of switch 132 may be switched or routed to an egress port (e.g., port 'P3') of switch 132. For example, test packets received from test server 102 via ports 'P1' and 'P2' of switch 132 may be sent to switch 134 via port 'P3' of switch 132 before the packets are then routed to test system 102 from switch 134.

In step 210, concurrently with receiving or processing test traffic, ports (e.g., ports 'P1', 'P2', and 'P3') of switch 132 may generate metadata (e.g., packet timestamps) and may copy all of some test traffic and send the copies and to one or more mirror ports (e.g., port 'MP1') of switch 132. For example, port 'P1' may encapsulate a copy of a received test packet in another packet along with a receipt timestamp indicating when the test packet arrived from test system 102 and/or a transmission timestamp indicating when the test packet was forwarded from port 'P1' to port 'P3' and may send the encapsulated packet to port 'MP1' for transmission to test system 102. In another example, port 'P1' may generate a version of a received packet that incorporates or includes metadata (e.g., a transmit timestamp and/or a receipt timestamp) and send this packet to port 'MP1' for transmission to test system 102.

In step 211, mirrored traffic (e.g., timestamped copies of test traffic) may be sent from port 'MP1' of switch 132 to PM 112 of test system 102. In some embodiments, after receiving mirrored traffic, PM 112 may provide some or all the mirrored traffic, including, for example, associated metadata (e.g., timestamp information, etc.), to test analyzer 122.

In step 212, test traffic at egress port 'P3' of switch 132 may be switched or routed to an ingress port (e.g., port 'P4') of switch 134. For example, test packets received from test server 102 via ingress ports 'P1' and 'P2' of switch 132 may be sent to switch 134 via egress port 'P3' of switch 132.

In step 213, test traffic received at ingress port (e.g., port 'P4') of switch 134 may be switched or routed to an egress port (e.g., port 'P5') of switch 134 for transmitting the test traffic back to test system 102. For example, test packets received at switch 134 may be routed or switched to test system 102 (or PM 110) via port 'P5' of switch 134.

In step 214, concurrently with receiving or processing test traffic, ports (e.g., ports 'P4' and 'P5') of switch 134 may generate metadata (e.g., packet timestamps) and may copy all of some test traffic and send the copies and to one or more mirror ports (e.g., port 'MP2') of switch 134. For example, port 'P4' may encapsulate a copy of a received test packet in another packet along with a receipt timestamp indicating when the test packet arrived at port 'P4' and/or a transmission timestamp indicating when the test packet was forwarded from port 'P4' to port 'P5' and may send the encapsulated packet to port 'MP2' for transmission to test system 102. In another example, port 'P4' may generate a version of a received packet that incorporates or includes metadata (e.g., a transmit timestamp and/or a receipt timestamp) and send this packet to port 'MP2' for transmission to test system 102.

In step 215, mirrored traffic (e.g., timestamped copies of test traffic) may be sent from port 'MP2' of switch 134 to PM 112 of test system 102. In some embodiments, after receiving mirrored traffic, PM 112 may provide some or all the mirrored traffic, including, for example, associated metadata (e.g., timestamp information, etc.), to test analyzer 122.

In step 216, metrics and/or statistics (e.g., associated with transmitted test traffic and collected by SCs 114 and 116) may be provided to and used by test analyzer 122. For example, test analyzer 122 may use a transmit timestamp indicating when a test packet was transmitted from PM 106 to port 'P1' of switch 132 to derive whether the test packet was received by port 'P1' of switch 132 or to determine a latency (or a start time for an ingress queue of switch 132) associated with port 'P1' of switch 132.

In step 217, SUT queue settings or related configuration information may be obtained and used by test analyzer 122. For example, test system 102 or another entity may obtain packet queue configuration information (e.g., a DCQCN setting, a PFC setting, an ECN setting, a maximum queue depth value, or an RDMA NIC setting) from switches 132 and 134 via a management API or interface. In another example, user 136 may input switch configuration information indicating the current configuration (including, for example, packet queue settings) of switches 132 and 134, e.g., manually as part of test configuration setup.

In step 218, queue performance analysis information or other test results may be generated and provided to user 136 or another entity.

In step 219, in some embodiments or test sessions, queue performance analysis information or other test results may be used (e.g., by SO 124) to generate SUT optimizations, e.g., packet queue settings adjustments for switch 132 and/or switch 134, and may be reported to user 136 or another entity. For example, test system 102 or a related entity (e.g., test controller 104) may communicate with switch 132 via a management interface and automatically configure or re-configure switch 132 and/or switch 134 to implement recommended packet queue adjustments generated by SO 124.

In some embodiments, SO 124 may use queue performance analysis information or other test results to generate and execute a new test session for testing SUT 130 or switches 132 and 134 thereof. For example, test system 102 or a related entity (e.g., test controller 104) may use a new or updated test session definition generated by SO 124 in running a subsequent test session for testing SUT 130 or switches 132 and 134 thereof.

It will be appreciated that FIG. 2 is for illustrative purposes and that different and/or additional steps other than those depicted in FIG. 2 may occur. Further, it will be appreciated that some steps may occur in a different order than depicted in FIG. 2 and that functionality described above in relation to FIG. 2 may be changed, altered, added, or removed. It will also be appreciated while the embodiment depicted in FIG. 2 involves switches 132 and 134, various embodiments may utilize different numbers of switches and switch ports and/or may involve interactions with other elements of SUT 130.

Figure 3:
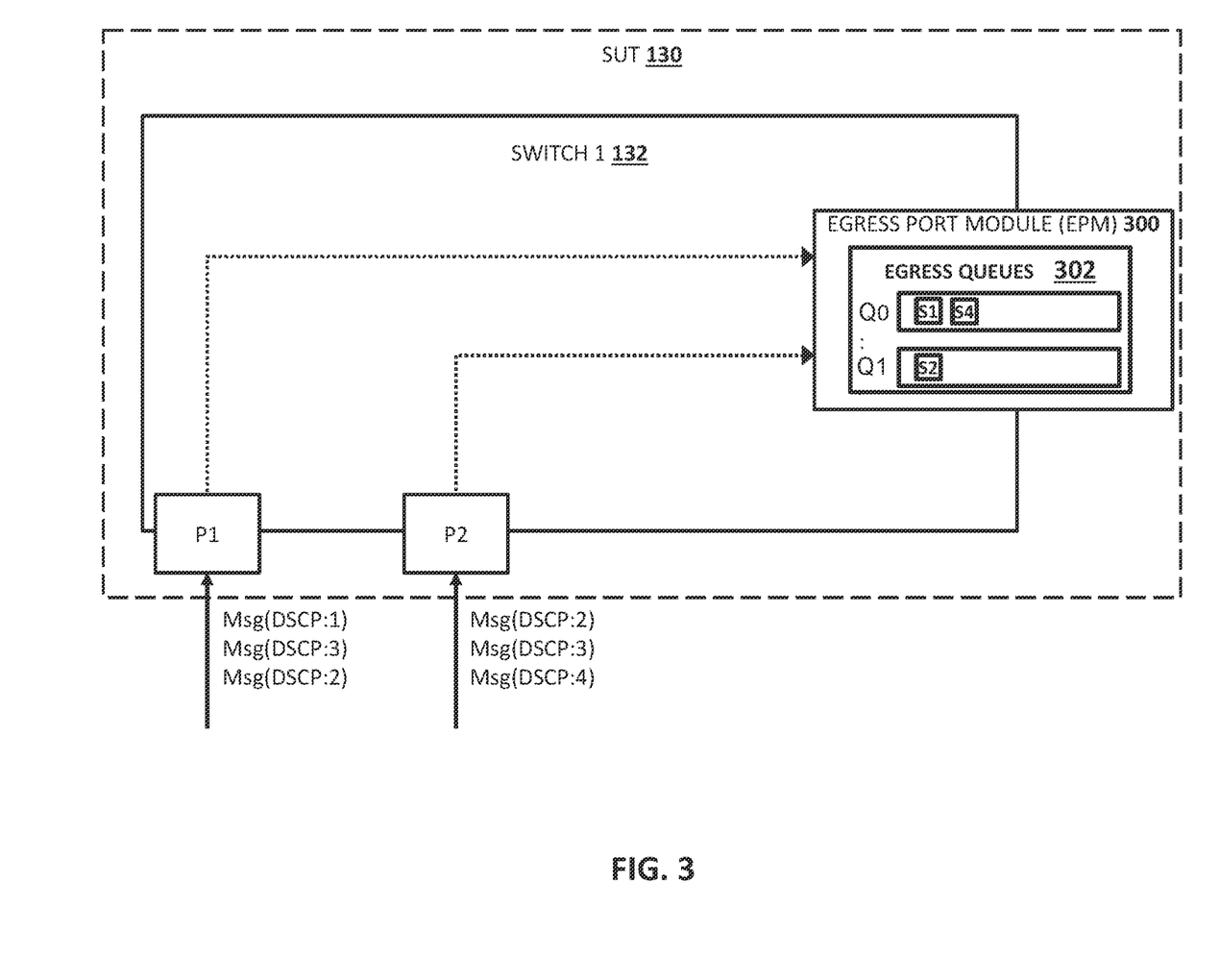
FIG. 3 is a block diagram illustrating an egress port module comprising two egress ports.

FIG. 3 is a block diagram illustrating an egress port module (EPM) 300 comprising egress queues 302. In some embodiments, SUT 130 may represent one or more switches, e.g., switch 132 and/or switch 134. In such embodiments, e.g., based on a test environment setup and/or related configuration, one or more ports (e.g., ports 'P1' and 'P2') of SUT 130 or switch 132 thereof may be used to receive test packets from test system 102 and one or more egress ports (e.g., EPM 300) of SUT 130 or switch 132 thereof may be used to send test packets back to test system 102.

In some embodiments, SUT 130 and related entities (e.g., EPM 300) may have different capabilities and/or functionality and, as such, test system 102 may utilize different test sessions or elements thereof to test particular capabilities or features. For example, as depicted in FIG. 3, in some test sessions, switch 132 may be SUT 130 and may include ports 'P1' and 'P2' for receiving test packets from test system 102 and may include EPM 300 for sending at least some of the test packets or versions thereof back to test system 102. In this example, as depicted in FIG. 3, EPM 300 may include egress queues 302, e.g., queue 'Q0' and 'Q1', where packets are queued in either queue 'Q0' or 'Q1' for transmission.

In some embodiments, e.g., as part of test configuration or predetermined by a network operator, a port or related entity of SUT 130 or switch 132 may be configured to assign packets to a particular queue of queues 302 based on packet header information, a queue assignment algorithm (e.g., a hashing algorithm, a round-robin selection algorithm, etc.), and/or other factors. For example, in some embodiments, ports 'P1' and 'P2' of switch 132 may be configured to generate hash values for received packets and assign the packets to respective queues based on the hash value.

In some embodiments, a packet identifier, a flow identifier, or one or more packet header parameter values may be used to assign packets to one of queues 302. In some embodiments, layer 3 classification schemes or related information can enable traffic classification beyond layer 2 (e.g., a local area network) and across routers. For example, a queue assigning entity (e.g., software and/or hardware executing on PMs or in switch 132) may inspect an 8-bit differentiated services field (DS field) in the IP header of packets destined for transmission by EPM 300. In this example, the queue assigning entity may use the DS field value or a portion thereof (e.g., a 6-bit differentiated services code point (DSCP)) in a packet to determine which queue of queues 302 temporarily stores the packet before transmission by EPM 300.

It will be appreciated that FIG. 3 is for illustrative purposes and that different and/or additional functionality other than that depicted in FIG. 3 may be useful for non-intrusive queue analysis and/or other purposes.

Figure 4:
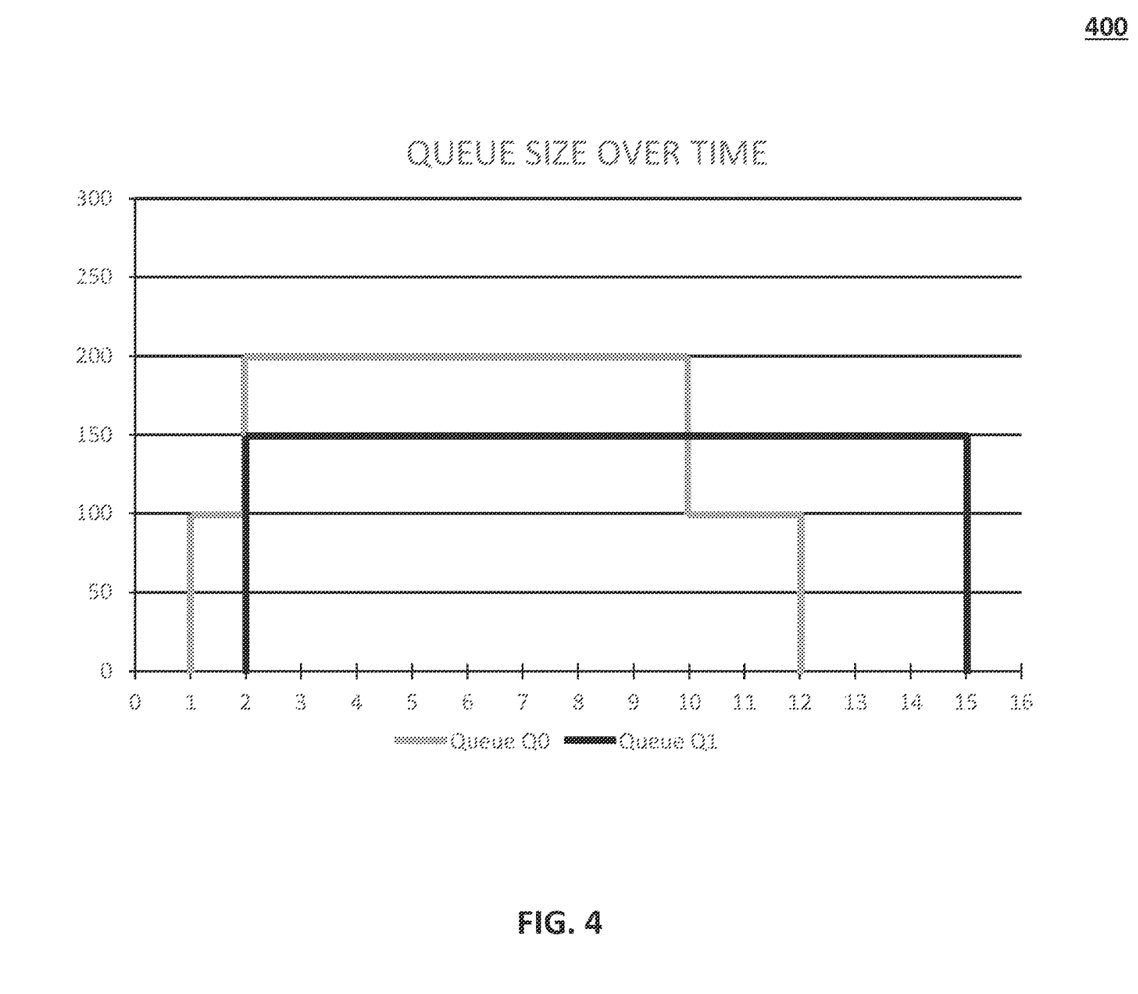
FIG. 4 is a line chart illustrating queue size over time for multiple queues of a SUT.

FIG. 4 is a line chart 400 illustrating queue size over time for multiple queues of SUT 130. In some embodiments, test analyzer 122 may generate test related information, such as line chart 400 or related calculations, after or during a test session (e.g., offline or online). For example, assuming a test environment where SUT 130 (e.g., switch 132) receives test packets at one or more ingress port(s) (e.g., ports 'P1' and 'P2' in FIG. 3) and that those received test packets are forwarded to an egress port (e.g., EPM 300) and that these ports are configured to mirror those test packets to test analyzer 122 or a related data store, test analyzer 122 may deem test packets were dropped by SUT 130, when it deems information about test packets (e.g., test packet content and received timestamps) mirrored from ingress port was received but that corresponding information (e.g., test packet content and transmit timestamps) about the test packets was not received from the egress port.

Referring to FIG. 4, line chart 400 may depict queue sizes (e.g., in bytes) over a period of time (e.g., 16 seconds) for two queues, represented as queue 'Q0' and queue 'Q1'. For example, line chart 400 may refer to a test session involving switch 132 and EPM 300 with egress queues 302. In this example, each of queues 302 may receive and temporarily hold various test packets (e.g., from or via ingress port '1' and ingress port '2' or other sources) during the test session. Continuing with this example, the queue sizes of queues 302 may change (e.g., increase or decrease) as packets are queued (e.g., received and temporarily stored) and dequeued (e.g., for transmission).

As depicted, line chart 400 is a stepped or step line chart. In some embodiments, a stepped or step line chart may indicate actual changes in queue size corresponding to various events. For example, when a packet is queued or dequeued, a queue size for a respective queue may change accordingly, otherwise the queue size may stay the same.

In some embodiments, a stepped or step line chart may indicate that respective queues (e.g., queues 302) are polled periodically for their queue size (e.g., every second of the test session) or that each queue size is calculated periodically (e.g., every second of the test session), and that "steps" in queue sizes are depicted when a different queue size value is obtained or calculated.

In some embodiments, queue size calculations may be based on metadata, such as timestamps or other information, obtained from or derived from data received from a mirroring port or another entity. For example, when a port of SUT 130 is configured to mirror traffic (e.g., copy test packets or other types of traffic) and forward it to an egress port for ultimately being sent to or processed by test analyzer 122, a mirroring port, the egress port, or another entity may generate metadata (e.g., a receipt timestamp, a transmit timestamp, a current count, one or more metrics, etc.) for the mirrored traffic and may provide the mirror traffic and/or related metadata to test analyzer 122 or a data store accessible by test analyzer 122. In this example, timestamps indicating when a test packet is received by a port and when the test packet is transmitted from a port, queue size for the port (or a related queue) can be calculated by adding up the byte size of packets that are queued concurrently (bytes are subtracted from the total when a packet is deemed no longer queued).

In some embodiments, a mirroring or mirrored port or other entity may generate one or more timestamps for test packets or other traffic. For example, where port 'P1' of SUT 130 is configured to mirror a packet it receives to another port (e.g., MP '1' of SUT 130), port 'P1' may generate a receipt timestamp indicating when the original packet was received by the port a transmit timestamp indicating when the mirrored packet or the original packet was sent from the port. In another example, e.g., when packets traverse ports sequentially, a receipt or transmit packet timestamp generated by one port (e.g., EPM 300) may be used to derive, estimate, or determine when a packet was queued or dequeued from another port (e.g., port 'P1'). In this example, a receipt timestamp indicating when a packet 'H' is received at a first port of switch 132 (e.g., port 'P1') and a receipt timestamp indicating when the packet 'H' is received at a second port (e.g., a port that receives the packet next, such as EPM 300) of switch 132 may approximately indicate how long packet 'H' was queued at the first PM. Similarly, a transmit timestamp indicating when a packet 'J' is transmitted by the first port of switch 132 to the second port of switch 132 and a transmit timestamp indicating when the packet 'J' is transmitted by the second port of switch 132 onward may approximately indicate how long packet 'J' was queued at the second port.

In some embodiments, where a same packet or version thereof (e.g., based on packet identifiers) is received at an ingress port of SUT 130 and then transmitted by an egress port of SUT 130, test analyzer 122 may calculate how long the packet was queued or buffered in SUT 130 by using the formula $T_{egress} - T_{ingress} = T_{delta}$, where $T_{egress}$ may represent a transmit timestamp of the packet indicating when the test packet was sent onward by the egress port of SUT 130 and $T_{ingress}$ may represent a received timestamp of the test packet indicating when the test packet was received at the ingress port of SUT 130. In some embodiments, test analyzer 122 may use timestamps, $T_{delta}$ calculations, and/or related calculation to determine jitter, a jitter average, minimum and/or maximum (e.g., of a test session or time period), packet distributions, and/or latency distributions.

Referring to queue 'Q0' of line chart 400, at time '0' seconds, queue 'Q0' has a queue size of 0 byte. At time '1' second (e.g., when a 100 byte sized packet is queued as indicated by metadata associated with port 'P1'), the queue size of queue 'Q0' increases from 0 bytes to 100 bytes. At time '2' seconds (e.g., when a second 100 byte sized packet is queued as indicated by metadata associated with port 'P2'), the queue size of queue 'Q0' increases from 100 bytes to 200 bytes. The queue size of queue 'Q0' remains at 200 bytes until time '10' seconds. At time '10' seconds (e.g., when the first packet is dequeued as indicated by metadata associated with EPM 300), the queue size of queue 'Q0' decreases from 200 bytes to 100 bytes. At time '11' seconds (e.g., when the second packet is dequeued as indicated by metadata associated with EPM 300), the queue size of queue 'Q0' decreases from 100 bytes to 0 bytes and remains at 0 bytes.

Referring to queue 'Q1' of line chart 400, at time '0' seconds, queue 'Q1' has a queue size of 0 bytes. The queue size of queue 'Q1' remains at 0 bytes until time '2' seconds. At time '2' seconds (e.g., when a 150 byte sized packet is queued as indicated by metadata associated with port 'P2'), the queue size of queue 'Q1' increases from 0 bytes to 150 bytes. The queue size of queue 'Q1' remains at 150 bytes until time '15' seconds. At time '15' seconds (e.g., when the 150 byte sized packet is dequeued as indicated by metadata associated with EPM 300), the queue size of queue 'Q1' decreases from 150 bytes to 0 bytes and remains at 0 bytes.

It will be appreciated that FIG. 4 is for illustrative purposes and that different and/or additional information other than those depicted in FIG. 4 may be useful for non-intrusive queue analysis and/or other purposes.

Figure 5:
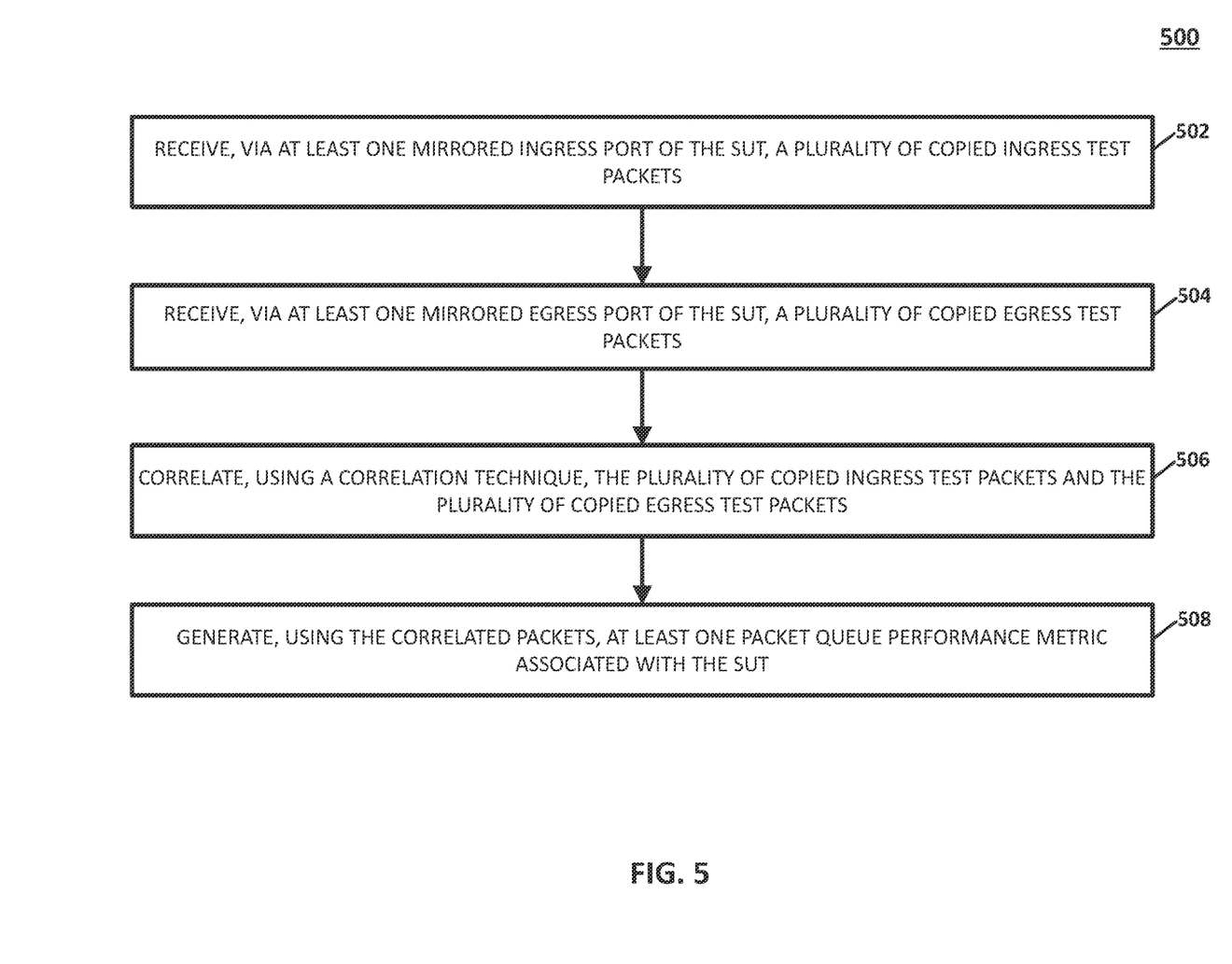
FIG. 5 is a flow chart illustrating an example process for non-intrusive queue analysis.

FIG. 5 is a diagram illustrating an example process 500 for non-intrusive queue analysis. In some embodiments, process 500, or portions thereof, may be performed by or at test system 102, test analyzer 122, test controller 104, and/or another node or module. In some embodiments, process 500 may include steps 502, 504, 506, and/or 508.

Referring to process 500, in step 502, a plurality of copied ingress test packets may be received via at least one mirrored ingress port of the SUT. For example, copied ingress test packets may include a copy of a first test packet from test system 102 and received by a first mirrored ingress port (e.g., ingress port 'P1' of switch 132). In this example, the copied first test packet may be generated by the first mirrored ingress port or another entity (e.g., a related PM or NIC) and may include metadata (e.g., a receipt and/or transmit timestamp) associated with the first test packet.

In step 504, a plurality of copied egress test packets may be received via at least one mirrored egress port of the SUT. For example, copied egress test packets may include a copy of a second test packet received by a first mirrored egress port (e.g., egress port 'P3' of switch 132). In this example, the copied second test packet may be generated by the first mirrored egress port or another entity (e.g., a related PM or NIC) and may include metadata (e.g., a receipt and/or transmit timestamp) associated with the second test packet. In this example, the second test packet may be a first test packet (e.g., that is from test system 102 and was received at ingress port 'P1' of switch 132) or a version thereof and may be sent to the first egress mirrored port for transmission back to test system 102.

In some embodiments, receiving a plurality of copied ingress test packets or receiving the plurality of copied egress test packets may include receiving associated traffic metadata, traffic metrics, or packet timestamp information and wherein the correlating may include using the associated traffic metadata, traffic metrics, or packet timestamp information.

In step 506, the plurality of copied ingress test packets and the plurality of copied egress test packets may be correlated using a correlation technique. For example, where ingress test packets are versions of some egress test packet, a correlation technique may involve matching packet header information (e.g., an 5-IP tuple), packet identifiers (e.g., a header or payload parameter value that identifies a packet or a version thereof), and/or related packet timestamp information (e.g., packets that are detected/mirrored within a small window of time of each other and have shared or common parameter values or other attributes).

In some embodiments, a first test packet obtained from a mirrored ingress port and a second test packet obtained from a mirrored egress port may be correlated, matched or deemed related when one or more packet identifiers in the packets are the same or when a set of packet header parameter values match. In this example, the correlated packets may indicate that these packets are substantially identical or that one packet is a version of the other packet (e.g., after or before some processing).

In some embodiments, correlation may also involve correlating test packets and/or metadata about test packets using one or more sources that are different and/or separate from SUT 130. For example, PM 106 may generate transmit timestamps and/or other metadata for each test packet that is sent to an ingress port of switch 132 and may store this information and/or a copy of the original test packet in an data store accessible to test analyzer 122. In this example, test analyzer 122 may correlate the stored information regarding a test packet and information about the test packet (or version thereof) from switch 132 (or a port thereof).

In step 508, at least one packet queue performance metric associated with the SUT may be generated using correlated packets. For example, test analyzer 122 may use timestamp information or other metadata associated with matched or correlated packets to determine various performance metrics (e.g., packet queue latency, jigger, etc.) In another example, a correlation technique may involve computing packet loss or other SUT related metrics, e.g., packet loss associated with SUT 130 may be determined by counting mirrored ingress packets that lack corresponding mirrored egress packets or vice versa.

In some embodiments, test system 102 or test analyzer 122 may use environment topology information and metadata associated with the correlated packets to derive or compute various metrics, statistics, or other information. For example, assuming test analyzer 102 knows that PM 106 transmit test packets to ingress port 'P1' of switch 132 with negligible propagation delay (e.g., via a one meter or less wired connection and without intermediate nodes in between), then test analyzer 122 may compute an approximate packet queue latency value or packet queuing delay value for a packet queue that stores packets received at ingress port 'P1' of switch 132 by subtracting a first transmit timestamp for a test packet 'T1' (e.g., indicating when test packet 'T1' was transmitted from PM 106 to ingress port 'P1' of switch 132) from a second transmit timestamp for the test packet 'T1' (e.g., indicating when test packet 'T1' was transmitted from ingress port 'P1' of switch 132 to egress port 'P3' of switch 132). In another example, assuming test analyzer 102 knows that an ingress port 'P1' of switch 132 forwards test packets to egress port 'P3' of switch 132 with negligible propagation delay, then test analyzer 122 may compute an approximate packet queue latency value or packet queuing delay value for a packet queue that stores packets received at ingress port 'P1' of switch 132 by subtracting a first receipt timestamp for a test packet 'T1' (e.g., indicating when test packet 'T1' was received at ingress port 'P1' of switch 132) from a second receipt timestamp for the test packet 'T1' (e.g., indicating when test packet 'T1' was received at egress port 'P3' of switch 132).

In some embodiments, test system 102 or test analyzer 122 may report test related information (e.g., at least one packet queue performance metric, an optimization plan, or other test results) to a test operator (e.g., user 136), test controller 102, or another entity (e.g., RO 126).

In some embodiments, test system 102 or test analyzer 122 may receive, via a management interface associated with SUT 130 or another source (e.g., an accessible data store), current packet queue settings associated with SUT 130. For example, when determining an optimization plan or generating a queue analysis or performance report, test analyzer 122 may obtain current SUT configuration or settings to use in its analysis.

In some embodiments, generating at least one packet queue performance metric may include generating, using input, packet queue configuration information for modifying packet queue settings or performance of SUT 130.

In some embodiments, input for generating packet queue configuration information (e.g., by test analyzer 122) may include a queue performance metric, a packet loss metric, a latency metric, or an adjustment criterium.

In some embodiments, packet queue settings for affecting queue performance of SUT 130 (e.g., generated by test analyzer 122) may include settings that affect packet congestion control (e.g., at queue and/or network level) and/or settings that change or adjust packet queue characteristics (e.g., depth, number of queues, location of queue, etc.). Example packet queue settings may include a data center quantized congestion notification (DCQCN) setting, a priority based flow control (PFC) setting, an explicit congestion notification (ECN) setting, a maximum queue depth value, or a remote direct memory access (RDMA) network interface card setting.

In some embodiments, (e.g., after packet queue configuration information (e.g., new packet queue settings) is generated by test analyzer 122), test controller may configure SUT 130 using the packet queue configuration information and may initiate a new test session.

In some embodiments, prior to testing the SUT, port mirroring configuration information may be provided to the SUT for configuring the at least one mirrored ingress port of the SUT and the at least one mirrored egress port of the SUT.

In some embodiments, a SUT may include one or more network switches or one or more network devices comprising one or more packet queues. For example, SUT 130 may include switches 132 and 134.

In some embodiments, a test system for executing process 500 or related aspects may include a NIC, a traffic generator, an FPGA, an ASIC, or a processor. For example, test system 102 may include a NIC, a traffic generator, an FPGA, an ASIC, and/or a processor.

It will be appreciated that process 500 is for illustrative purposes and that different and/or additional actions may be used. It will also be appreciated that various actions described herein may occur in a different order or sequence.

It should be noted that test system 102, test analyzer 122, and/or functionality described herein may constitute a special purpose computing device. Further, test system 102, test analyzer 122, and/or functionality described herein can improve the technological field of network equipment testing by providing various techniques for non-intrusive queue analysis. For example, test system 102 or a related entity (e.g., test controller 104) may configure SUT 130 or related entities (e.g., switches 132 and 134 or related PMs) to provide mirrored traffic and related metadata to test system 102 for analysis. In this example, test system 102 or a related entity (e.g., test analyzer 122) may analyze and/or correlate the mirrored traffic and/or the metadata (e.g., by matching related packets using timestamps) and/or use this information for generating performance metrics associated with SUT 130, e.g., packet queue latency, jitter metrics, packet distributions, etc. Hence, a test system in accordance with aspects described herein may non-intrusively analyze the performance of SUT queues (e.g., at switch 132 and/or switch 134), e.g., without requiring SUT 130 to have or support a performance or statistics reporting API or module or without requiring SUT 130 to have queue performance monitoring functionality.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for non-intrusive queue analysis, the method comprising:
   at a test analyzer of a test system, the test analyzer for analyzing packet queue performance of a system under test (SUT):
   receiving, via at least one mirrored ingress port of the SUT, a plurality of copied ingress test packets;
   receiving, via at least one mirrored egress port of the SUT, a plurality of copied egress test packets;
   correlating, using a correlation technique, the plurality of copied ingress test packets and the plurality of copied egress test packets;
   and generating, using the ingress and egress test correlated packets, at least one packet queue performance metric associated with the SUT,
   wherein generating the at least one packet queue performance metric includes calculating a queue size over time associated with a port of the DUT by (i) using timestamps of the correlated ingress and egress packets to determine packets were received by the port, concurrently enqueued at the port, and transmitted from the port and (ii) summing byte sizes of the packets concurrently enqueued at the port.

2. The method of claim 1 comprising:
   reporting the at least one packet queue performance metric or other test results to a test operator, a test controller, or another entity.

3. The method of claim 1 comprising:
   receiving, via a management interface associated with the SUT or another source, current packet queue settings associated with the SUT.

4. The method of claim 1 wherein generating the at least one packet queue performance metric includes generating, using input, packet queue configuration information for modifying packet queue settings or performance of the SUT.

5. The method of claim 4 wherein the input includes a queue performance metric, a packet loss metric, a latency metric, or an adjustment criterium.

6. The method of claim 4 wherein the packet queue settings include a data center quantized congestion notification (DCQCN) setting, a priority based flow control (PFC) setting, an explicit congestion notification (ECN) setting, a maximum queue depth value, or a remote direct memory access (RDMA) network interface card setting.

7. The method of claim 4 comprising:
   at a test controller:
   configuring, using the packet queue configuration information, the SUT; and
   initiating a new test session.

8. The method of claim 1 wherein receiving the plurality of copied ingress test packets or receiving the plurality of copied egress test packets includes receiving associated traffic metadata, traffic metrics, or packet timestamp information and wherein the correlating includes using the associated traffic metadata, traffic metrics, or packet timestamp information.

9. The method of claim 1 wherein the test system is configured for:
   prior to testing the SUT, providing port mirroring configuration information to the SUT for configuring the at least one mirrored ingress port of the SUT and the at least one mirrored egress port of the SUT, wherein the SUT includes one or more network switches or one or more network devices comprising one or more packet queues.

10. A system for non-intrusive queue analysis, the system comprising: a test system comprising: at least one processor; a memory;
    and a test analyzer for analyzing packet queue performance of a system under test (SUT), wherein the test analyzer is implemented using the at least one processor and the memory, the test analyzer configured for:

receiving, via at least one mirrored ingress port of the SUT, a plurality of copied ingress test packets;

receiving, via at least one mirrored egress port of the SUT, a plurality of copied egress test packets;

correlating, using a correlation technique, the plurality of copied ingress test packets and the plurality of copied egress test packets;

and generating, using the ingress and egress test correlated packets, at least one packet queue performance metric associated with the SUT, wherein generating the at least one packet queue performance metric includes calculating a queue size over time associated with a port of the DUT by (i) using timestamps of the correlated ingress and egress packets to determine packets were received by the port, concurrently enqueued at the port, and transmitted from the port and (ii) summing byte sizes of the packets concurrently enqueued at the port.

11. The system of claim 10 wherein the test analyzer is configured for reporting the at least one packet queue performance metric or other test results to a test operator, a test controller, or another entity.

12. The system of claim 10 wherein the test analyzer is configured for receiving, via a management interface associated with the SUT or another source, current packet queue settings associated with the SUT.

13. The system of claim 10 wherein the test analyzer is configured for generating, using input, packet queue configuration information for modifying packet queue settings or performance of the SUT.

14. The system of claim 13 wherein the input includes a queue performance metric, a packet loss metric, a latency metric, or an adjustment criterium.

15. The system of claim 13 wherein the packet queue settings include a data center quantized congestion notification (DCQCN) setting, a priority based flow control (PFC) setting, an explicit congestion notification (ECN) setting, a maximum queue depth value, or a remote direct memory access (RDMA) network interface card setting.

16. The system of claim 13 comprising:
a test controller configured for:
configuring, using the packet queue configuration information, the SUT; and
initiating a new test session.

17. The system of claim 10 wherein the test analyzer is configured for receiving associated traffic metadata, traffic metrics, or packet timestamp information and for using the associated traffic metadata, traffic metrics, or packet timestamp information in the correlating.

18. The system of claim 10 wherein the test system is configured for:
prior to testing the SUT, providing port mirroring configuration information to the SUT for configuring the at least one mirrored ingress port of the SUT and the at least one mirrored egress port of the SUT, wherein the SUT includes one or more network switches or one or more network devices comprising one or more packet queues.

19. The system of claim 10 wherein the at least one mirrored egress port includes multiple queues for queuing egress test packets from different sources, wherein packet header information of an egress test packet is used to determine one of the multiple queues for the egress test packet.

20. A non-transitory computer readable medium having stored thereon executable instructions that when executed by at least one processor of at least one computer cause the at least one computer to perform steps comprising:

receiving, via at least one mirrored ingress port of a system under test (SUT), a plurality of copied ingress test packets;

receiving, via at least one mirrored egress port of the SUT, a plurality of copied egress test packets;

correlating, using a correlation technique, the plurality of copied ingress test packets and the plurality of copied egress test packets;

and generating, using the ingress and egress test correlated packets, at least one packet queue performance metric associated with the SUT, wherein generating the at least one packet queue performance metric includes calculating a queue size over time associated with a port of the DUT by (i) using timestamps of the correlated ingress and egress packets to determine packets were received by the port, concurrently enqueued at the port, and transmitted from the port and (ii) summing byte sizes of the packets concurrently enqueued at the port.

* * * * *